United States Patent
Yao et al.

(10) Patent No.: US 9,116,784 B2
(45) Date of Patent: Aug. 25, 2015

(54) SYSTEM AND METHOD FOR PREVENTING VEHICLE FROM ROLLING OVER IN CURVED LANE

(71) Applicant: Automotive Research & Test Center, Lugang, Changhua County (TW)

(72) Inventors: Chi-Chun Yao, Lugang (TW); Jin-Yan Hsu, Lugang (TW); Chun-Hsiung Chen, Lugang (TW); Tsung-Hua Hsu, Lugang (TW); Yi-Feng Su, Lugang (TW)

(73) Assignee: Automotive Research & Test Center, Lugang, Changhua County (TW)

( * ) Notice: Subject to any disclaimer, the term of this patent is extended or adjusted under 35 U.S.C. 154(b) by 105 days.

(21) Appl. No.: 13/711,327

(22) Filed: Dec. 11, 2012

(65) Prior Publication Data

US 2014/0081542 A1 Mar. 20, 2014

(30) Foreign Application Priority Data

Sep. 18, 2012 (TW) .............................. 101134111 A (51) Int. Cl.
| | |
|---|---|
| *G06F 17/10* | (2006.01) |
| *G06F 19/00* | (2011.01) |
| *G06F 17/00* | (2006.01) |
| *B60W 50/14* | (2012.01) |
| *B60W 30/04* | (2006.01) |
| *B60W 40/072* | (2012.01) |
| *B60W 40/10* | (2012.01) |
| *B60W 40/105* | (2012.01) |

(52) U.S. Cl.
CPC .............. *G06F 17/00* (2013.01); *B60W 30/04* (2013.01); *B60W 40/072* (2013.01); *B60W 40/10* (2013.01); *B60W 40/105* (2013.01); *B60W 50/14* (2013.01)

(58) Field of Classification Search
CPC ..... G06F 17/00; B60W 30/04; B60W 40/072; B60W 40/10; B60W 40/105; B60W 50/14
USPC .................................................... 701/70, 124
See application file for complete search history.

(56) References Cited

U.S. PATENT DOCUMENTS

| | | | | |
|---|---|---|---|---|
| 6,424,907 | B1 * | 7/2002 | Rieth et al. ..................... | 701/124 |
| 6,714,848 | B2 * | 3/2004 | Schubert et al. ................ | 701/46 |

(Continued)

OTHER PUBLICATIONS

T.D. Gillespie, "Fundamentals of Vehicle Dynamics", Society of Automotive Engineers, Inc., 1992, at least pp. vii-xiii, 293, and 309-333.*

*Primary Examiner* — Fadey Jabr
*Assistant Examiner* — Angelina Shudy
(74) *Attorney, Agent, or Firm* — Muncy, Geissler, Olds & Lowe, P.C.

(57) ABSTRACT

The present invention proposes a system and method for preventing a vehicle from rolling over in curved lane. The road images captured by the image capture devices are used to calculate road information. The road information together with the vehicular dynamic information, such as the speed and acceleration of the vehicle are used to predict the rollover angle and lateral acceleration of the vehicle moving on the curved lane. The height of the gravity center and critical rollover speed of the vehicle moving on the curved lane are worked out and used to define a vehicular rollover index. If the vehicular rollover index exceeds a preset value, the system warns the driver or directly controls the speed of the vehicle to prevent the vehicle from rolling over in the curved lane.

10 Claims, 8 Drawing Sheets

(56) References Cited

U.S. PATENT DOCUMENTS

| | | | |
|---|---|---|---|
| 7,197,388 B2* | 3/2007 | Xu et al. | 701/70 |
| 2003/0093207 A1* | 5/2003 | Pallot | 701/70 |
| 2005/0060082 A1* | 3/2005 | Heuer et al. | 701/70 |
| 2007/0008090 A1* | 1/2007 | Gertsch et al. | 340/435 |
| 2007/0067085 A1* | 3/2007 | Lu et al. | 701/70 |
| 2008/0281482 A1* | 11/2008 | Huang | 701/29 |
| 2009/0201140 A1* | 8/2009 | Fargas et al. | 340/441 |
| 2010/0251956 A1* | 10/2010 | Hilliard | 116/35 R |
| 2011/0251749 A1* | 10/2011 | Schwarz et al. | 701/29 |
| 2012/0173083 A1* | 7/2012 | Hsu et al. | 701/45 |
| 2012/0313769 A1* | 12/2012 | Holbert et al. | 340/440 |
| 2015/0046035 A1* | 2/2015 | Kikuchi et al. | 701/37 |
| 2015/0105938 A1* | 4/2015 | Seki | 701/1 |

* cited by examiner

SYSTEM AND METHOD FOR PREVENTING VEHICLE FROM ROLLING OVER IN CURVED LANE

BACKGROUND OF THE INVENTION

1. Field of the Invention

The present invention relates to a technology to prevent a vehicle from rolling over in a curved lane, particularly to a system and method, which can more accurately predict rollover of a vehicle moving on a curved lane via estimating the height of the gravity center of the vehicle.

2. Description of the Related Art

Automobiles have been indispensable for most families, and traffic accidents also fast increase with the rapid popularization of automobiles. Most of traffic accidents can be attributed to that the drivers are heedless of the road conditions. For example, the drivers do not decelerate in curved lanes and cause the vehicles to rush out of the curved lanes or roll over in the curved lanes.

Some GPS- or image recognition-based curve rollover prevention systems have been developed to promote driving safety, which can warn the driver with sounds when there is a curved lane ahead of the vehicle. The conventional curve rollover prevention systems do provide warning signals to prevent from vehicular rollover. However, they do not take in consideration the dynamic factors of the vehicle moving on a curved lane, such as the speed and lateral acceleration of the vehicle. Therefore, a drop exists between the reality and the estimation in the conventional curve rollover prevention systems. Nevertheless, measurement of dynamic parameters of a vehicle, such as the height variation of the gravity center of a vehicle and the rollover angle of the vehicle, is a difficult problem hard to surmount in developing a curve rollover prevention system. While moving on a curved lane, a vehicle would tilt slightly with its gravity center varied. The shift of the gravity center is very likely to influence the prediction of rollover speed.

Accordingly, the present invention proposes a system and method for preventing a vehicle from rolling over in a curved lane to overcome the abovementioned problems.

SUMMARY OF THE INVENTION

The primary objective of the present invention is to provide a system and method for preventing a vehicle from rolling over in a curved lane, which uses the vehicular status sensing module and the road images captured by the image capture devices to estimate the rollover angle and the variation of the gravity center of the vehicle moving on a curved lane, whereby the critical rollover speed of the vehicle can be more accurately predicted.

Another objective of the present invention is to provide a system and method for preventing a vehicle from rolling over in a curved lane, which uses an extended Kalman filter to predict the future dynamic variation for the vehicle running toward the road ahead.

A further objective of the present invention is to provide a system and method for preventing a vehicle from rolling over in a curved lane, which predicts the rollover speed and rollover index of a vehicle and reminds the driver to decelerate or take appropriate actions to prevent from vehicular rollover.

To achieve the abovementioned objectives, the present invention proposes a method to prevent a vehicle from rolling over in a curved lane, which comprises steps: using at least two image capture devices to capture at least one image of the road before the vehicle, and using the road image to calculate the curvature and banking of the curved lane; using the road image to estimate the variation of the turning angle of the steering wheel of the vehicle, and using the turning angle information and a plurality of types of vehicular dynamic information to estimate the rollover angle and lateral acceleration of the vehicle moving on the curved lane; working out the height of the gravity center and critical rollover speed of the vehicle moving on the curved lane according to the rollover angle, the lateral acceleration and the dynamic information of the vehicle; using the height of the gravity center, the rollover angle and the lateral acceleration to define a vehicular rollover index, substituting the values of various parameters to the vehicular rollover index, and sending out a warning signal or a control signal if the vehicular rollover index exceeds a preset value.

The present invention also proposes a system for preventing a vehicle from rolling over in a curved lane, which is installed in a vehicle, and which comprises at least two image capture devices capturing images of the road before the vehicle; a vehicular status sensing module detecting the vehicular dynamic information, such as the speed, tilt angle, and acceleration of the vehicle; and a processor connected with the image capture devices and the vehicular status sensing module, using the road images to calculate the road information, and using the road information and the vehicular dynamic information to compute the height of the gravity center and critical rollover speed of the vehicle moving on the curved lane, using the height of the gravity center and the critical rollover speed to define a vehicular rollover index, and sending out a warning signal or a control signal if the vehicular rollover index exceeds a preset value.

Below, embodiments are described in detail to make easily understood the objectives, technical contents, characteristics and accomplishments of the present invention.

DETAILED DESCRIPTION OF THE INVENTION

The present invention proposes a system and method for preventing a vehicle from rolling over in a curved lane. The system of the present invention is installed in a vehicle. The method of the present invention uses an image processing technology to process the images of the road before the vehicle to obtain the road information, and uses the road information and the vehicular dynamic information, including the speed and acceleration of the vehicle to predict other types of dynamic information of the vehicle moving on the curved lane, compute the height of the gravity center and critical rollover speed of the vehicle moving on the curved lane, and reminds the driver to decelerate or take appropriate actions to prevent the vehicle from rolling over in the curved lane.

Figure 1:
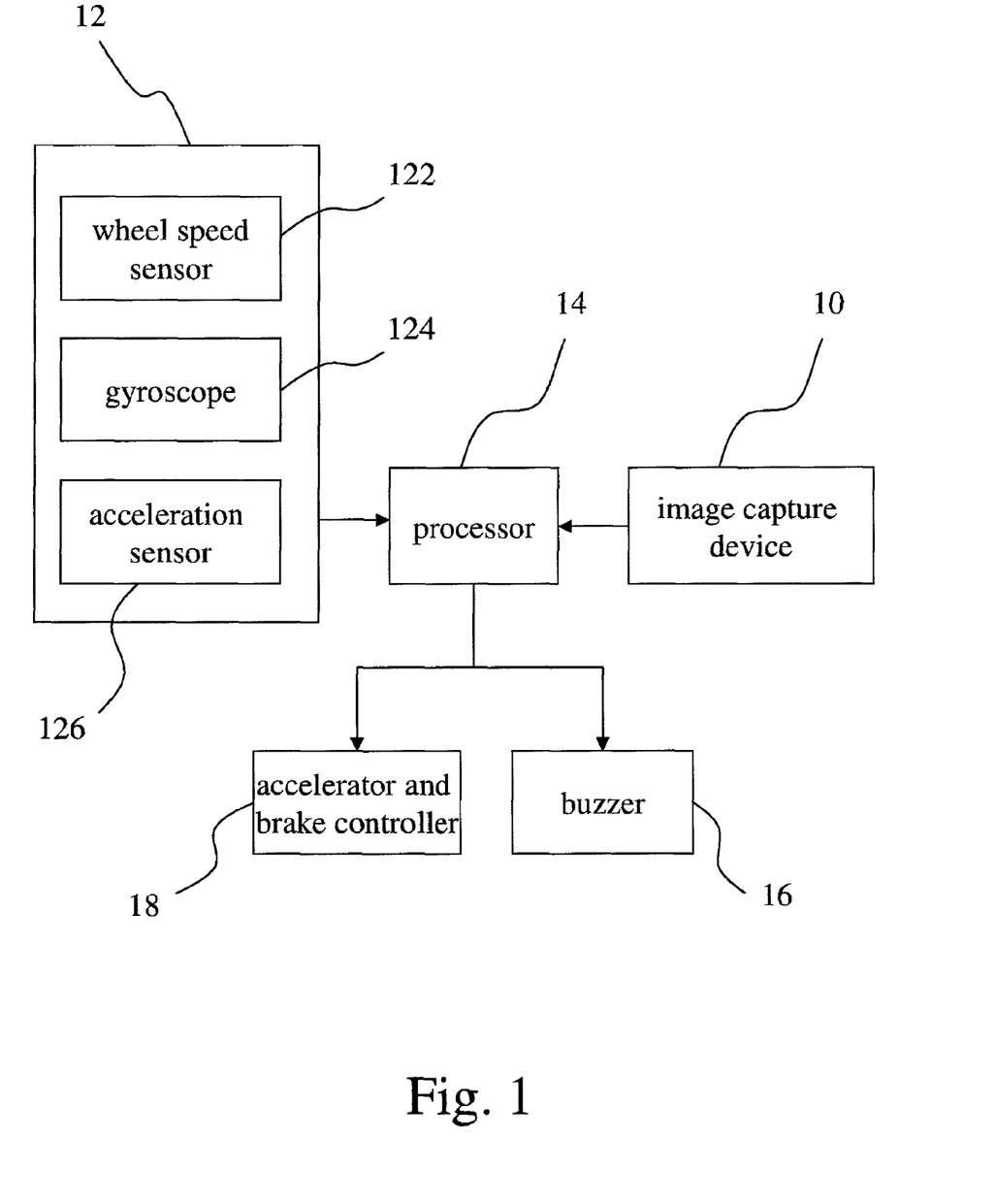
FIG. 1 shows a block diagram of a system for preventing a vehicle from rolling over in a curved lane according to one embodiment of the present invention.

Refer to FIG. 1 showing a block diagram of a system for preventing a vehicle from rolling over in a curved lane according to one embodiment of the present invention. The system of the present invention comprises at least two image capture devices 10, a vehicular status sensing module 12 and a processor 14. The image capture devices 10 are installed in the vehicle for capturing the images of the road before the vehicle. The vehicular status sensing module 12 is used to detect the vehicular dynamic information, such as the speed, tilt angle and acceleration of the vehicle. The processor 14 connects with the image capture devices 10 and the vehicular status sensing module 12. The processor 14 uses the road images captured by the image capture devices 10 to calculate the road information, such as the curvature and banking of the curved lane. Then, the processor 14 uses the road information and the vehicular dynamic information detected by the vehicular status sensing module 12 to calculate the height of the gravity and critical rollover speed of the vehicle moving on the curved lane and define a vehicular rollover index.

The vehicular status sensing module 12 includes a wheel speed sensor 122, a gyroscope 124 and an acceleration sensor 126. The wheel speed sensor 122 is installed in a wheel to detect the rotation speed of the wheel. The gyroscope 124 detects the variation of the posture of the vehicle. The acceleration sensor 126 detects the acceleration of the vehicle.

The system for preventing a vehicle from rolling over in a curved lane further comprises a buzzer 16 and an accelerator and brake controller 18. If the vehicular rollover index exceeds the preset value while the vehicle is moving on a curved lane, the buzzer 16 emits warning sounds. Alternatively, the processor 14 outputs a control signal to enable the accelerator and brake controller 18 to control the accelerator and the brake and regulate the speed of the vehicle. Thereby, the vehicle runs in the curved lane in a lower speed.

Figure 2:
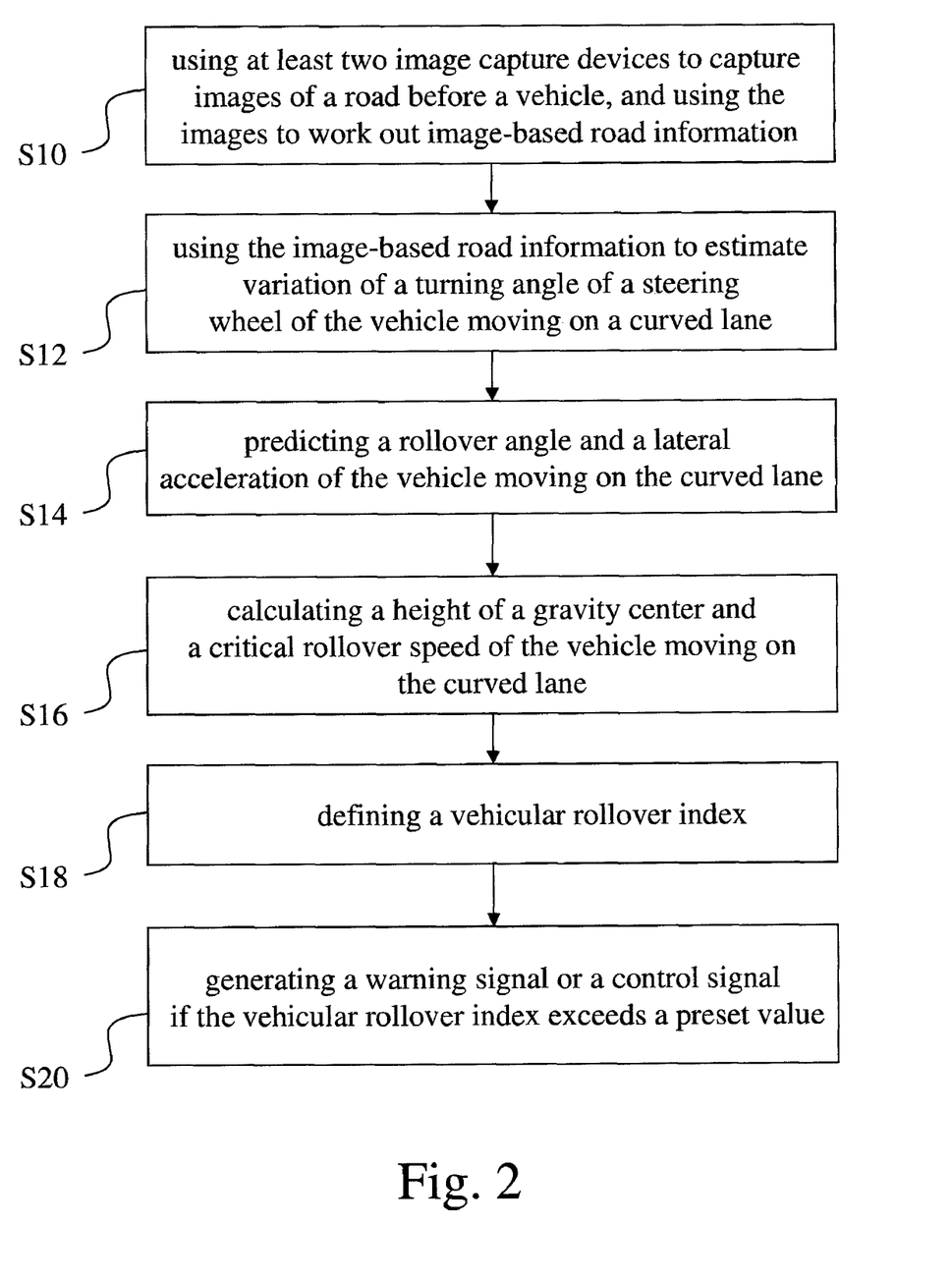
FIG. 2 shows a flowchart of a method for preventing a vehicle from rolling over in a curved lane according to one embodiment of the present invention.
Figure 3A:
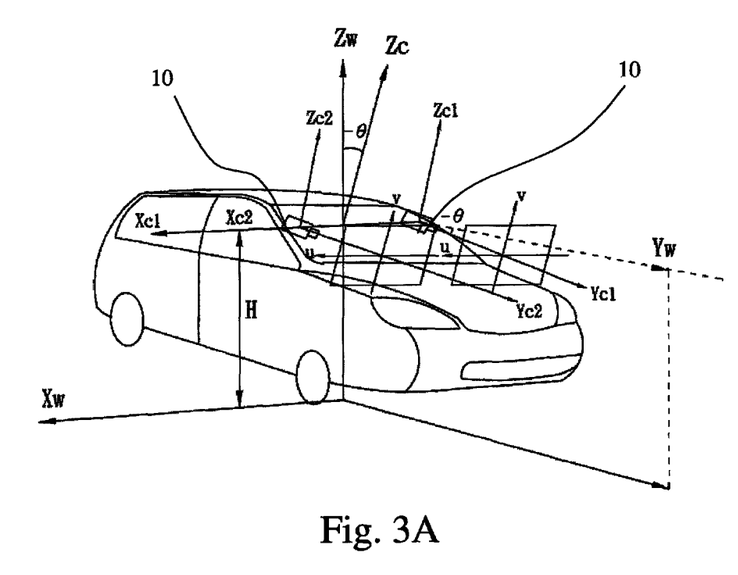
FIG. 3A schematically shows that a traffic lane model transforms the coordinates of the image capture devices from the global coordinate system to the image coordinate system according to one embodiment of the present invention.
Figure 3B:
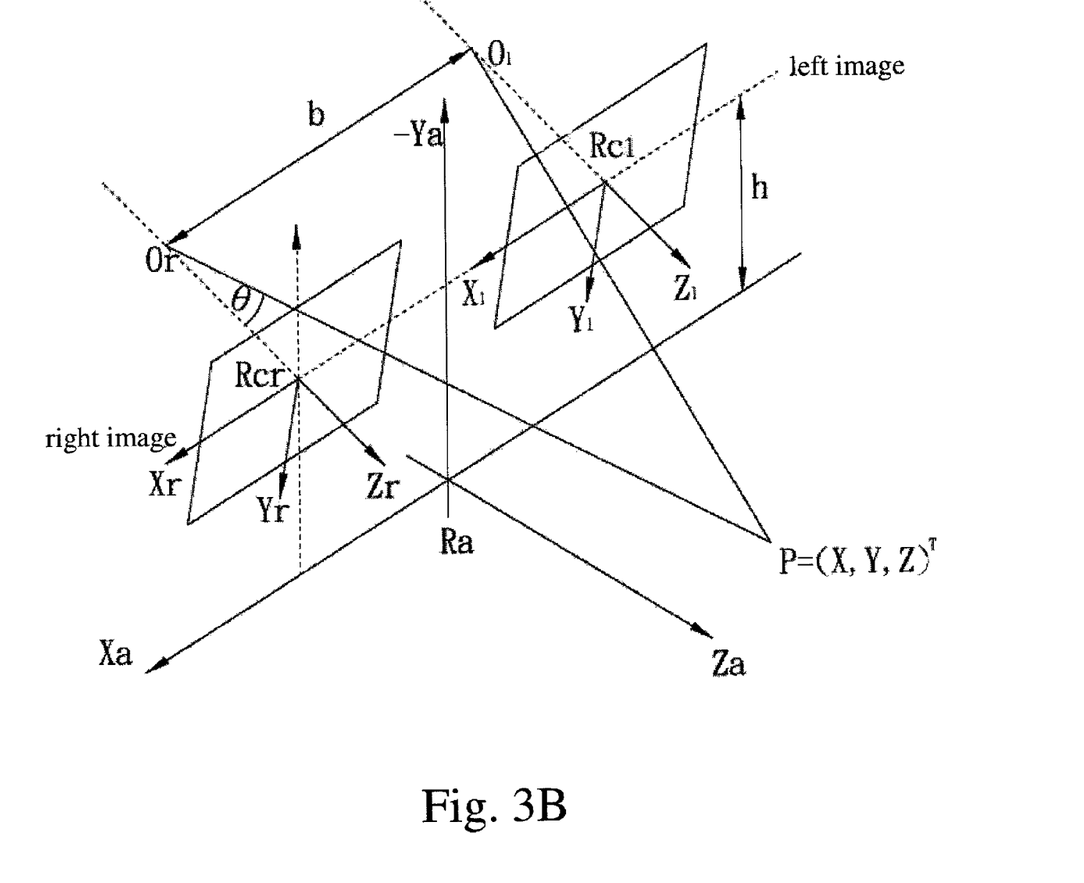
FIG. 3B schematically shows that a 3-dimensional image processing method obtains depth images of the road according to one embodiment of the present invention.

Refer to FIG. 2 showing a flowchart of a method for preventing a vehicle from rolling over in a curved lane according to one embodiment of the present invention. In Step S10, after the system is switched on, the image capture devices capture the images of the road before the vehicle and detect the road environment; the processor uses the road images and the height of the image capture devices to compute a curve of the traffic lane model and obtain the road information, such as the curvature and banking of the curved lane. The processor cannot calculate the road banking unless there are images respectively captured by more than two image capture devices. Refer to FIG. 3A and FIG. 3B. FIG. 3A schematically shows that a traffic lane model transforms the coordinates of the image capture devices from the global coordinate system to the image coordinate system according to one embodiment of the present invention. FIG. 3B schematically shows that a 3-dimensional image processing method obtains depth images of the road according to one embodiment of the present invention. The traffic lane model based on the global coordinate system is projected to the image coordinate system according to Equation (1):

$$u = \frac{k e_u e_v H}{e_v m_\theta - v} + m e_u + \frac{b e_u}{H e_v}(e_v m_\theta + v) \quad (1)$$

wherein u is the coordinate in the horizontal axis of the image plane, and wherein v is the coordinate in the vertical axis of the image plane, and wherein $e_u$ is a fundamental magnitude of the focal length of the image capture device 10 in the u direction, which has been transformed to the image coordinate system, and wherein $e_v$ is a fundamental magnitude of the focal length of the image capture device 10 in the v direction, which has been transformed to the image coordinate system, and wherein the fundamental magnitudes are measured by pixels, and wherein H is the height of the image capture device 10 installed in the vehicle, and wherein k, m and b are parameters of the traffic lane model, and wherein $m_\theta$ is the tilt angle of the image capture device 10. The tilt angle of the image capture device 10 is an included angle between the physical traffic lane and the central line of the image capture device 10. If the physical traffic lane is uphill or inclined, the processor would compute a curvature outside the tolerance.

In Step S10, u, v, $e_u$, $e_v$, H, and $m_\theta$ obtained from road images respectively captured at different time points are used to calculate the values of the parameters k, m and b. Substitute k, m and b into a traffic lane model expressed by Equation (2):

$$x = k \cdot y^2 + m \cdot y + b \quad (2)$$

whereby is obtained a curve of the traffic lane model. The curvature can be calculated from the curve.

Figure 4:
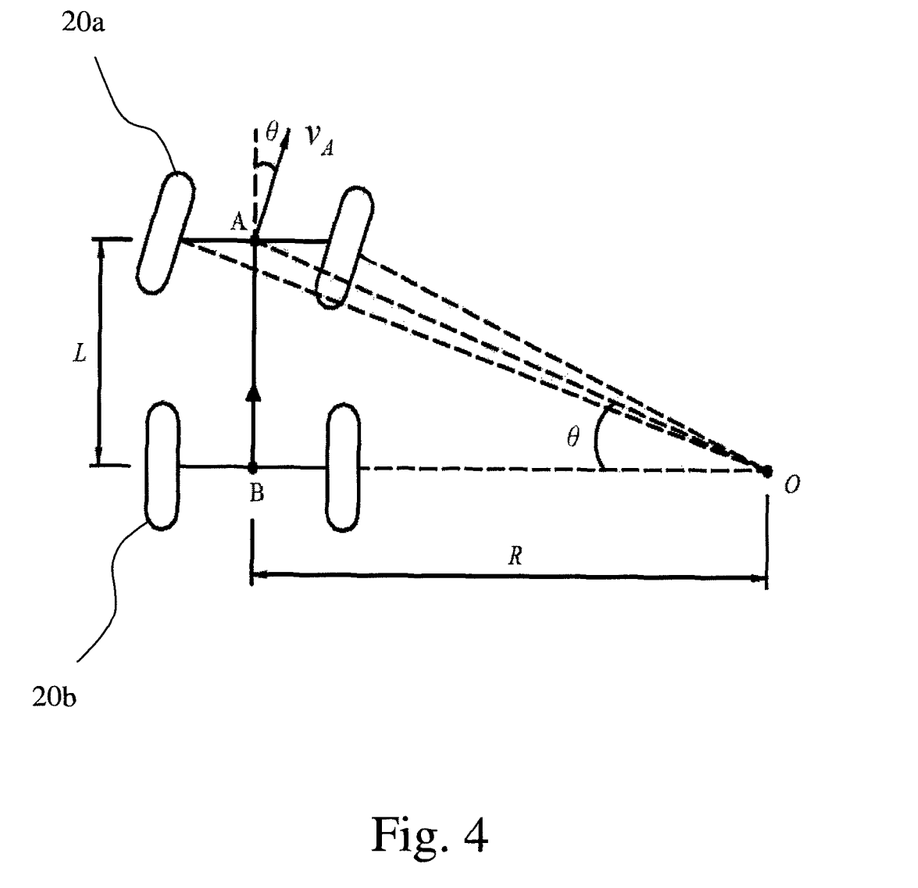
FIG. 4 schematically showing a vehicle moving on a curved lane according to one embodiment of the present invention.

In Step S12, use the road images to calculate the variation of the turning angle of the steering wheel of the vehicle moving on the curved lane. Refer to FIG. 4 schematically showing a vehicle moving on a curved lane, wherein R is the curvature radius of the curved lane, θ the turning angle of the wheel, L the wheelbase between the front wheels 20a and the rear wheels 20b. The turning angle of the steering wheel can be worked out from Equation (3):

$$\hat{\theta} = 57.3 L/R + K a_y$$

$$\hat{\sigma} = \text{steering\_ratio} \times \hat{\theta} \quad (3)$$

wherein $\hat{\sigma}$ is the steering angle of the steering wheel; K is the gradient of insufficient turning, which is required by the lateral slide effect generated by high speed; $a_y$ is the lateral acceleration, steering_ratio is the gear ratio of the steering wheel angle to the tuning angle of the front wheel.

In Step S14, substitute the curvature of the curved lane, the banking of the curved lane, the variation of the turning angle of the steering wheel and a plurality of types of the vehicular dynamic information into the extended Kalman filter (EKF) to predict the rollover angle and lateral acceleration of the vehicle moving on the curved lane. The extended Kalman filter includes the following equations.

$\hat{x}_{(k-1)}$ and $P_{(k-1)}$ are the last estimated values. Next, update the time, and predict the system state of the next time point according to Equation (4):

$$\hat{x}_k^- = f(\hat{x}_{k-1}, u_{k-1}, 0)$$

$$P_k^- = A_k P_{k-1} A_k^T + W_k Q_{k-1} W_k^T \quad (4)$$

Next, undertake measurement and update Equation (4) according to Equation (5):

$$K_k = P_k^- H_k^T (H_k P_k^- H_k^T + v_k R_k v_k^T)^{-1}$$

$$\hat{x}_k = \hat{x}_k^- + K_k(z_k - h(\hat{x}_k^-, 0))$$

$$P_k = (I - K_k H_k) P_k^- \quad (5)$$

wherein $x_k$ and $u_k$ are respectively the system state and the input vector, $P_k$ is the error covariance, $K_k$ is the Kalman gain, $z_k$ is the measurement vector, $v_k$ is the Jacobians matrix of measurement, and $R_k$ is the covariance matrix of measurement noise. After the calculation of Equation (5) is completed, input the new values to Equation (4) to update Equation (4). Equation (4) is repeatedly updated via repeating the abovementioned process.

Figure 5A:
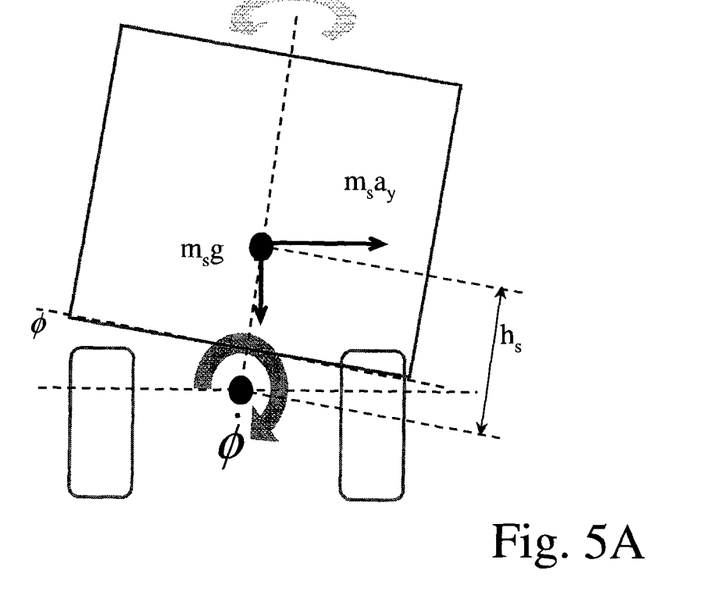
FIG. 5A and FIG. 5B are respectively a front view and a top view of a vehicle moving on a curved lane according to one embodiment of the present invention.
Figure 5B:
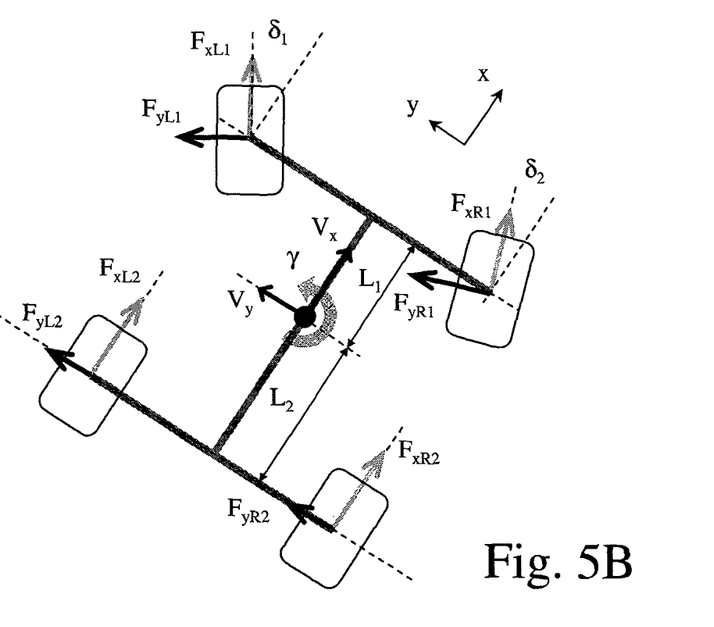

EKF can be used to analyze various models, including the roll model, the longitudinal model, the yaw model and the lateral model. Refer to FIG. 5A and FIG. 5B respectively a front view and a top view of a vehicle moving on a curved lane according to one embodiment of the present invention. The roll model can be expressed by Equation (6):

$$\ddot{\phi} = \frac{1}{I_x}(m_s a_y h_s \cos\phi + m_s g h_s \sin\phi - C_R \dot{\phi} - k_R \phi + I_{zx} r) \quad (6)$$

The longitudinal model can be expressed by Equation (7):

$$\dot{V}x = \frac{1}{m}(F_{xL1}\cos\delta_1 - F_{yL1}\sin\delta_1 + F_{xR1}\cos\delta_2 - F_{yR1}\sin\delta_2 + \quad (7)$$
$$F_{xL2}\cos\delta_3 - F_{yL2}\sin\delta_3 + F_{xR2}\cos\delta_4 - F_{yR2}\sin\delta_4)$$

The yaw model can be expressed by Equation (8):

$$\dot{\gamma} = \frac{1}{I_z}\begin{bmatrix}(F_{xL1}\sin\delta_1 + F_{yL1}\cos\delta_1 + F_{xR1}\cos\delta_2 + F_{yR1}\cos\delta_2) \times L_1 - \\ (F_{xL2}\sin\delta_3 + F_{yL2}\cos\delta_3 + F_{xR2}\sin\delta_4 + F_{yR2}\sin\delta_4) \times L_2 + \\ (F_{xL1}\cos\delta_1 - F_{yL1}\sin\delta_1 - F_{xR1}\sin\delta_2 + F_{yR1}\sin\delta_2) \times \frac{E_1}{2} + \\ (F_{xL2}\cos\delta_3 - F_{yL2}\sin\delta_3 - F_{xR2}\cos\delta_4 + F_{yR2}\sin\delta_4) \times \frac{E_2}{2}\end{bmatrix} \quad (8)$$

The lateral model can be expressed by Equation (9):

$$\dot{V}y = \frac{1}{m}(F_{xL1}\sin\delta_1 + F_{yL1}\cos\delta_1 + F_{xL2}\sin\delta_3 + F_{yL2}\cos\delta_3 + \quad (9)$$
$$F_{xR1}\sin\delta_2 + F_{yR1}\cos\delta_2 + F_{xR2}\sin\delta_4 + F_{yR2}\cos\delta_4)$$

wherein $F_{x1}$ is the longitudinal component vector of the front wheel axis, $F_{y1}$ is the lateral component vector of the front wheel axis, $F_{x2}$ is the longitudinal component vector of the rear wheel axis, $F_{y2}$ is the lateral component vector of the rear wheel axis. The rollover angle $\theta$ and the lateral acceleration $a_y$ of a vehicle moving on a curved lane can be worked out from the abovementioned models.

Figure 6:
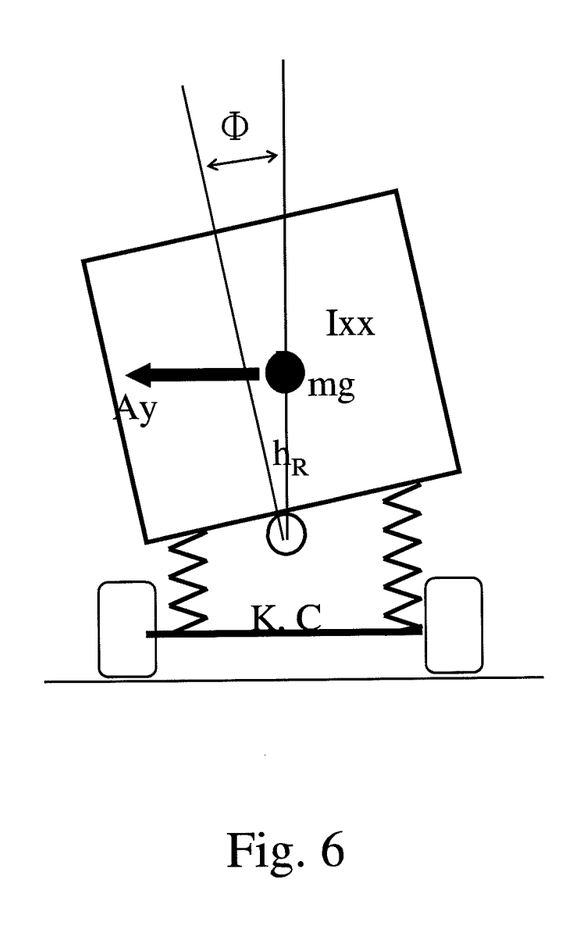
FIG. 6 schematically shows the shift of the gravity center of a vehicle according to one embodiment of the present invention.

In Step S16, use the rollover angle, the lateral acceleration and the vehicular dynamic information to calculate the height of the gravity center and critical rollover speed of the vehicle moving on the curved lane. Refer to FIG. 6 schematically showing the shift of the gravity center of a vehicle according to one embodiment of the present invention. As a vehicle moving on a curved lane would tilt, the gravity center thereof is displaced. In such a case, the height of the gravity center is calculated according to Equation (10):

$$h'_R = \frac{m(g\sin\phi + a_y) \pm \sqrt{m^2(g\sin\phi + a_y)^2 - 4m\dot{\phi}\lambda}}{2m\dot{\phi}} \quad (10)$$

wherein $\lambda = I_{xx}\ddot{\phi} + \frac{1}{2}KE^2 \sin\phi + \frac{1}{2}CE^2 \cdot \sin\dot{\phi}$. Equation (10) is derived from Equation (11) (the vehicle model):

$$(I_{xx} + mh'^2_R)\ddot{\phi} = ma_y h'_R + mgh'_R\sin\phi - \frac{1}{2}KE^2\sin\phi - \frac{1}{2}CE^2\sin\dot{\phi} \quad (11)$$

In Equations (10) and (11), $I_{xx}$ is the rotation inertia, m is the weight of the vehicle, $h'_R$ is the predicted height of the gravity center, $\theta$ is the rollover angle of the vehicle, C is the damping coefficient, K is the stiffness coefficient, E is the wheel tread.

After the new height of the gravity center is worked out, calculate the critical rollover speed. Suppose that the vehicle runs in the curved lane at a constant speed. Thus is established Equation (12):

$$\frac{a_y}{g} = \frac{l}{(h_R + h_r)} - \frac{\phi(h_R)}{(h_R + h_r)}, a_y = \frac{V^2_{max}}{R} \quad (12)$$

wherein $h_r$ is the height of the gravity center with respect to the ground, and $l=\frac{1}{2}$ of the wheel tread. Thus, the allowed maximum speed (i.e. the critical speed) is expressed by Equation (13):

$$V_{max} = \sqrt{\frac{l - \phi(h_R)}{(h_R + h_r)}gR} \quad (13)$$

Figure 7:
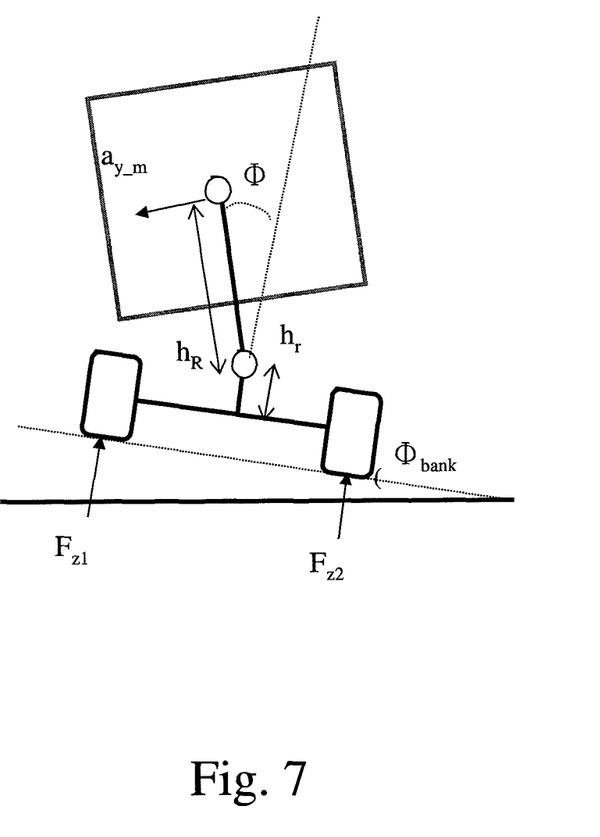
FIG. 7 schematically shows a vehicle going to roll over according to one embodiment of the present invention.

In Step S18, use the height of the gravity center, the rollover angle and the lateral acceleration to define a vehicular rollover index. Refer to FIG. 7. The vehicular rollover index is expressed by Equation (14):

$$RI = \frac{F_{z1} - F_{z2}}{F_{z1} + F_{z2}} \approx \frac{2}{E} \cdot h_R \cdot \cos\phi^2 \cdot (a_y + \sin\phi_{bank}) \quad (14)$$

In Step S20, substitute the resultant values of the abovementioned calculations into the vehicular rollover index; the system sends out a warning signal or a control signal if the vehicular rollover index exceeds a preset value. For example, it is supposed that the vehicle will roll over when the vehicular rollover index RI equals 1 or −1. Thus, while RI>0.6, the warning signal enables the buzzer to emit warning sounds to remind the driver to decelerate. In another embodiment, the control signal directly controls the accelerator and brake to regulate the speed of the vehicle. In yet another embodiment, different indicators respectively indicate different vehicular states. For example, the green light indicates the vehicle is running at a safe speed; the yellow light indicates that the vehicle needs deceleration; the red light indicates that the vehicle needs further deceleration.

In conclusion, the present invention proposes a system and method for preventing a vehicle from rolling over in a curved lane, which uses the image-based road information, the extended Kalman filter, and the gravity-center-height algorithm to estimate the vehicular dynamic information of the road ahead, including the rollover angle, the lateral acceleration, and the new height of the gravity center of the tilted vehicle and then precisely works out the danger index (the vehicular rollover index) and the allowed maximum speed (the critical rollover speed), and which warns the driver to prevent from rollover if the vehicular rollover index reaches the preset value.

The embodiments described above are only to exemplify the present invention but not to limit the scope of the present invention. Any equivalent modification or variation according to the characteristic or spirit of the present invention is to be also included within the scope of the present invention.

What is claimed is:

1. A method for preventing a vehicle from rolling over in curved lane, comprising steps:

using at least two image capture devices to capture at least one image of a road before said vehicle, and using said image of said road, Equation:

$$u = \frac{k e_u e_v H}{e_v m_\theta - v} + m e_u + \frac{b e_u}{H e_v}(e_v m_\theta + v)$$

and Equation: $x = k \cdot^2 + m \cdot y + b$ to calculate, by a processor, a curvature of said curved lane and a banking of said curved lane;

using said image of said road to estimate, by the processor, variation of a turning angle of a steering wheel of said vehicle moving by Equation: $\hat{\zeta}=57.3L/R+ Ka_y$, $\sigma$=steering_ratio$\times\hat{\zeta}$ on said curved lane, and using said variation of said turning angle and a plurality of types of vehicular dynamic information to predict a rollover angle and a lateral acceleration by Equation:

$$\ddot{\phi} = \frac{1}{I_x}(m_s a_y h_s \cos\phi + m_s g h_s \sin\phi - C_R \dot{\phi} - k_R \phi + I_{zx} r),$$

Equation:

$$\dot{V}_x = \frac{1}{m}\begin{pmatrix} F_{xL1}\cos\delta_1 + F_{yL1}\sin\delta_1 + F_{xR1}\cos\delta_2 + F_{yR1}\sin\delta_2 + \\ F_{xL2}\cos\delta_3 + F_{yL2}\sin\delta_3 + F_{xR2}\cos\delta_4 + F_{yR2}\sin\delta_4 \end{pmatrix},$$

Equation:

$$\dot{y} = \frac{1}{I_z}\begin{bmatrix} (F_{xL1}\sin\delta_1 + F_{yL1}\cos\delta_1 + F_{xR1}\cos\delta_2 + F_{yR1}\cos\delta_2)\times L_1 - \\ (F_{xL2}\sin\delta_3 + F_{yL2}\cos\delta_3 + F_{xR2}\sin\delta_4 + F_{yR2}\sin\delta_4)\times L_2 + \\ (F_{xL1}\cos\delta_1 - F_{yL1}\sin\delta_1 - F_{xR1}\sin\delta_2 + F_{yR1}\sin\delta_2)\times \frac{E_1}{2} + \\ (F_{xL2}\cos\delta_3 - F_{yL2}\sin\delta_3 - F_{xR2}\cos\delta_4 + F_{yR2}\sin\delta_4)\times \frac{E_2}{2} \end{bmatrix}$$

and Equation:

$$\dot{V}_y = \frac{1}{m}\begin{pmatrix} F_{xL1}\sin\delta_1 + F_{yL1}\cos\delta_1 + F_{xL2}\sin\delta_3 + F_{yL2}\cos\delta_3 + \\ F_{xR1}\sin\delta_2 + F_{yR1}\cos\delta_2 + F_{xR2}\sin\delta_4 + F_{yR2}\cos\delta_4 \end{pmatrix};$$

using said rollover angle, said lateral acceleration, and said vehicular dynamic information to calculate, by the processor, a height of a gravity center of said vehicle by Equation:

$$h'_R = \frac{m(g\sin\phi + a_y) \pm \sqrt{m^2(g\sin\phi + a_y)^2 - 4m\ddot{\phi}\lambda}}{2m\ddot{\phi}}$$

and a critical rollover speed by Equation:

$$\frac{a_y}{g} = \frac{l}{(h_R + h_r)} - \frac{\phi(h_R)}{(h_R + h_r)}, \quad a_y = \frac{V_{max}^2}{R}$$

when said vehicle moving on said curved lane; and
defining a vehicle rollover index by Equation:

$$RI = \frac{F_{z1} - F_{z2}}{F_{z1} + F_{z2}} \approx \frac{2}{E} \cdot h_R \cdot \cos\phi^2 \cdot (a_y + \sin\phi_{bank})$$

by using said height of said gravity center, said rollover angle, and said lateral acceleration, and generating a warning signal or a control signal if said vehicular rollover index exceeds a preset value.

2. The method for preventing the vehicle from rolling over in curved lane according to claim 1, wherein a curve of a traffic lane model is calculated with said image of said at least one image of said road and height of said image capture devices.

3. The method for preventing the vehicle from rolling over in curved lane according to claim 1, wherein said vehicular dynamic information includes a turning angle of wheels, a lateral speed, a curvature radius, a steering ratio, a vehicle weight, a stiffness coefficient, a damping coefficient, a wheel tread, a wheelbase between a front-wheel axis and a rear-wheel axis, and a rotation inertia.

4. The method for preventing the vehicle from rolling over in curved lane according to claim 1, wherein said rollover angle and said lateral acceleration are predicted with an extended Kalman filter.

5. A system for preventing a vehicle from rolling over in curved lane, which is installed in said vehicle, comprising at least two image capture devices capturing at least one image of a road before said vehicle;

a vehicular status sensing module detecting a plurality of types of vehicular dynamic information, wherein said vehicular dynamic information includes a speed, a tilt angle and an acceleration of said vehicle; and a processor connected with said at least two image capture devices and said vehicular status sensing module, using said image of said road to compute a plurality of road information, using said road information and said vehicular dynamic information to calculate a height of a gravity center of said vehicle moving on said curved lane by Equation:

$$h'_R = \frac{m(g\sin\phi + a_y) \pm \sqrt{m^2(g\sin\phi + a_y)^2 - 4m\ddot{\phi}\lambda}}{2m\ddot{\phi}}$$

and a critical rollover speed by Equation:

$$\frac{a_y}{g} = \frac{1}{(h_R + h_r)} - \frac{\phi(h_R)}{(h_R + h_r)}, \quad a_y = \frac{V_{max}^2}{R},$$

defining a vehicular rollover index by Equation:

$$RI = \frac{F_{z1} - F_{z2}}{F_{z1} + F_{z2}} \approx \frac{2}{E} \cdot h_R \cdot \cos\phi^2 \cdot (a_y + \sin\phi_{bank}),$$

and outputting a warning signal or a control signal if said vehicular rollover index exceeds a preset value.

6. The system for preventing the vehicle from rolling over in curved lane according to claim 5, wherein said vehicular status sensing module further comprises a wheel speed sensor installed in a wheel of said vehicle and detecting a rotation speed of said wheel;

a gyroscope measuring posture variation of said vehicle; and an acceleration sensor detecting acceleration of said vehicle.

7. The system for preventing the vehicle from rolling over in curved lane according to claim 5, wherein said vehicular dynamic information includes a turning angle of wheels, a lateral speed, a curvature radius, a steering ratio, a vehicle weight, a stiffness coefficient, a damping coefficient, a wheel tread, a wheelbase between a front-wheel axis and a rear-wheel axis, and a rotation inertia.

8. The system for preventing the vehicle from rolling over in curved lane according to claim 5, wherein said road information includes a curvature of said curved lane and a banking of said curved lane, and wherein said processor uses said road information and height of said image capture devices to calculate a curve of a traffic lane model.

9. The system for preventing the vehicle from rolling over in curved lane according to claim 5 further comprising a buzzer triggered by said warning signal to emit warning sounds.

10. The system for preventing the vehicle from rolling over in curved lane according to claim 5 further comprising an accelerator and brake controller, which regulates speed of said vehicle according to said control signal.

* * * * *